United States Patent
Chang

(10) Patent No.: US 11,233,418 B2
(45) Date of Patent: Jan. 25, 2022

(54) CHARGING TERMINATION CONTROL MODULE AND BATTERY CHARGER CIRCUIT

(71) Applicant: Chengdu Monolithic Power Systems Co. Ltd., Chengdu (CN)

(72) Inventor: Junchang Chang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 279 days.

(21) Appl. No.: 16/515,620

(22) Filed: Jul. 18, 2019

(65) Prior Publication Data
US 2020/0036209 A1 Jan. 30, 2020

(30) Foreign Application Priority Data
Jul. 24, 2018 (CN) .......................... 201810815418.6

(51) Int. Cl.
*H02J 7/00* (2006.01)

(52) U.S. Cl.
CPC .... *H02J 7/007184* (2020.01); *H02J 7/00718* (2020.01)

(58) Field of Classification Search
USPC .................................. 320/158–159, 163–164
See application file for complete search history.

(56) References Cited

U.S. PATENT DOCUMENTS

| | | | |
|---|---|---|---|
| 8,664,918 B2 * | 3/2014 | Yoshikuni | H02J 7/0072 320/128 |
| 2012/0133340 A1 * | 5/2012 | Masumoto | H02J 7/00 320/164 |
| 2012/0302805 A1 * | 11/2012 | De | B01F 5/0256 585/2 |

\* cited by examiner

*Primary Examiner* — Samuel Berhanu
(74) *Attorney, Agent, or Firm* — Perkins Coie LLP

(57) ABSTRACT

A charging termination control module and a battery charger circuit comprising the same. The charging termination control module may detect/monitor/sense a charging current flowing through a charging control transistor of the battery charger circuit to provide a current sense signal, and to maintain a transistor voltage drop across the charging control transistor at a predetermined difference value once the transistor voltage drop reaches the predetermined difference value. The charging termination control module may also turn the charging control transistor off once the current sense signal is decreased to reach or to be lower than a charging termination threshold.

20 Claims, 2 Drawing Sheets

CHARGING TERMINATION CONTROL MODULE AND BATTERY CHARGER CIRCUIT

CROSS-REFERENCE TO RELATED APPLICATION(S)

This application claims the benefit of CN application No. 201810815418.6 filed on Jul. 24, 2018 and incorporated herein by reference.

TECHNICAL FIELD

This disclosure relates generally to electrical circuit, and more particularly but not exclusively relates to charging termination control for a battery charger circuit.

BACKGROUND

Li-ion or Li-polymer and other chargeable batteries make the portable devices to have smaller size and higher mobility. To ensure the good performance of the batteries, the batteries should be charged suitably during practical application. To identify whether the batteries are fully charged so as to timely terminate the charging is one of the important battery control stages. Therefore, it is desired to provide a charging termination control circuit with higher precision.

SUMMARY

In accomplishing the above and other objects, there has been provided, in accordance with an embodiment of the present invention, a charging termination control module. The charging termination control module may comprise a charging control transistor having a first terminal configured to receive a regulated system voltage and a second terminal configured to provide a charging voltage and a charging current. The charging termination control module may further comprise a charging current sense circuit and a charging termination determination circuit. The charging current sense circuit may be configured to detect/monitor/sense the charging current to provide a current sense signal indicative of the charging current. The charging termination determination circuit may be configured to receive the current sense signal and to compare the current sense signal with a charging termination threshold, wherein the charging termination determination circuit is further configured to turn the charging control transistor off when the current sense signal reaches or is lower than the charging termination threshold. The charging termination control module may further comprise a charging termination tuning circuit. The charging termination tuning circuit may be configured to receive the system voltage and the charging voltage, to compare a difference between the system voltage and the charging voltage with a predetermined difference value, and to control the charging control transistor to enter and operate in its saturation region once the difference between the system voltage and the charging voltage reaches the predetermined difference value.

The charging current sense circuit may have a sensing offset at an input terminal of the charging current sense circuit, and wherein the predetermined difference value is greater than the sensing offset.

The charging termination tuning circuit may comprise a tuning amplifier having a first tuning-amplifier input terminal, a second tuning-amplifier input terminal and a tuning-amplifier output terminal. The tuning amplifier is configured to receive a superposition signal at the first tuning-amplifier input terminal and to receive the system voltage at the second tuning amplifier input terminal, wherein the superposition signal is provided by superposing the charging voltage with the predetermined difference value. The charging termination tuning circuit may further comprise a tuning transistor having a first terminal coupled to the control terminal of the charging control transistor, a second terminal connected to a reference ground and a control terminal coupled to the tuning-amplifier output terminal.

There has also been provided, in accordance with an embodiment of the present invention, battery charger circuit comprising a charging control transistor and a charging termination control module. The charging control transistor may have a first terminal, a second terminal and a control terminal. The charging termination control module may be coupled to the first terminal, the second terminal and the control terminal of the charging control transistor. The charging termination control module may be configured to detect/monitor/sense a charging current flowing through the charging control transistor and to turn off the charging control transistor once the charging current is decreased to reach or to be lower than a predetermined charging termination current. The charging termination control module may further be configured to maintain a transistor voltage drop across the first terminal and the second terminal of the charging control transistor at a predetermined difference value once the transistor voltage drop reaches the predetermined difference value.

In accordance with an embodiment, the charging termination control module may be configured to control the charging control transistor to enter and operate in its saturation region once the transistor voltage drop reaches the predetermined difference value.

In accordance with an embodiment, the charging termination control module may comprise a charging current sense circuit configured to detect/monitor/sense the charging current to provide a current sense signal indicative of the charging current; a charging termination determination circuit configured to receive the current sense signal and to compare the current sense signal with a charging termination threshold to turn the charging control transistor off when the current sense signal reaches or is lower than the charging termination threshold; and a charging termination tuning circuit, configured to compare the transistor voltage drop with the predetermined difference value and to maintain the transistor voltage drop at the predetermined difference value once the transistor voltage drop reaches the predetermined difference value.

In accordance with an embodiment, the charging termination tuning circuit may comprise a tuning amplifier having a first tuning-amplifier input terminal, a second tuning-amplifier input terminal and a tuning-amplifier output terminal. The first tuning-amplifier input terminal may be coupled to the second terminal of the charging control transistor with the predetermined difference value superposed thereto. The second tuning-amplifier input terminal may be coupled to the first terminal of the charging control transistor. The charging termination tuning circuit may further comprise a tuning transistor having a first terminal coupled to the control terminal of the charging control transistor, a second terminal connected to a reference ground and a control terminal coupled to the tuning-amplifier output terminal.

There has also been provided, in accordance with an embodiment of the present invention, a charging termination control module, comprising a charging current sense circuit, a charging termination determination circuit and a charging termination tuning circuit. The charging current sense circuit may be configured to detect/monitor/sense a charging current flowing through a charging control transistor to provide a current sense signal. The charging termination determination circuit may be configured to receive the current sense signal and to compare the current sense signal with a charging termination threshold to turn the charging control transistor off when the current sense signal reaches or is lower than the charging termination threshold. The charging termination tuning circuit may be configured to compare a transistor voltage drop across the charging control transistor with a predetermined difference value and to maintain the transistor voltage drop at the predetermined difference value once the transistor voltage drop reaches the predetermined difference value.

In accordance with an embodiment, the charging termination tuning circuit may comprise a tuning amplifier and a tuning transistor. The tuning amplifier may be configured to detect or receive the transistor voltage drop and to calculate a difference between the transistor voltage drop and the predetermined difference value to provide a difference signal at a tuning-amplifier output terminal. The tuning transistor may have a first terminal coupled to the control terminal of the charging control transistor, a second terminal connected to a reference ground and a control terminal coupled to the tuning-amplifier output terminal.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
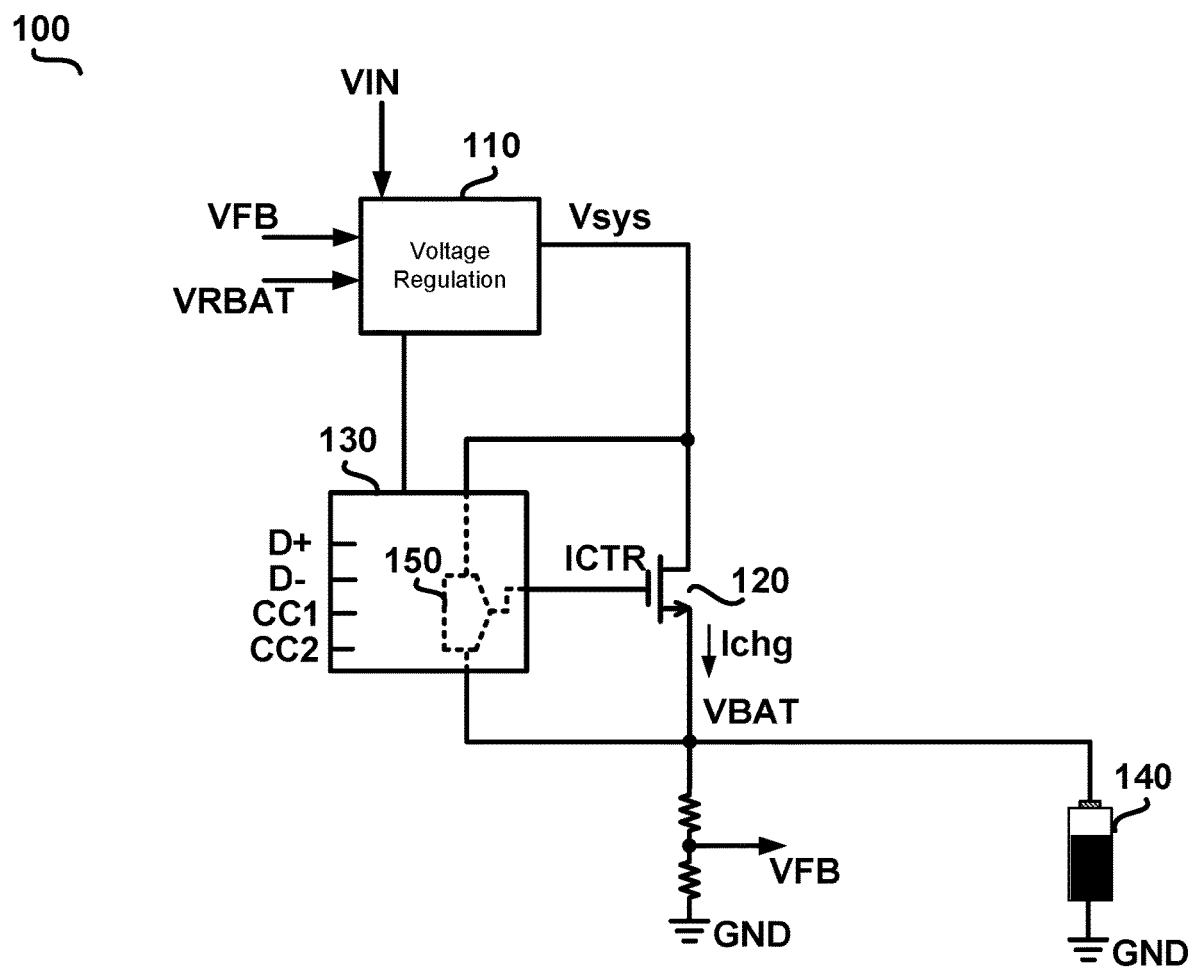
FIG. 1 illustrates a block diagram of a battery charger circuit 100 in accordance with an embodiment of the present invention.

FIG. 1 illustrates a block diagram of a battery charger circuit 100 in accordance with an embodiment of the present invention. The battery charger circuit 100 may comprise a voltage regulation circuit 110, a charging control transistor 120 and a charging regulation circuit 130. The battery charger circuit 100 may provide a charging voltage VBAT and a charging current Ichg to charge a battery or a battery pack 140.

The voltage regulation circuit 110 may be configured to receive an input voltage VIN and to regulate the input voltage VIN to provide a system voltage Vsys based on a feedback signal VFB indicative of the charging voltage VBAT and a reference signal VRBAT indicative of a desired charging voltage by the battery or battery pack 140.

The charging control transistor 120 may have a first terminal coupled to the voltage regulation circuit 110 to receive the system voltage Vsys, a second terminal configured to provide the charging voltage VBAT and the charging current Ichg, and a control terminal coupled to the charging regulation circuit 130 to receive a charging control signal ICTR.

The charging regulation circuit 130 may comprise a positive data port D+, a negative data port D−, a first configuration port CC1 and a second configuration port CC2. The charging regulation circuit 130 may be configured to regulate the battery charger circuit 100 to operate in an appropriate charging mode based on information on the positive data port D+, the negative data port D−, the first configuration port CC1 and the second configuration port CC2. For instance, the appropriate charging mode should match with protocols of an adaptor that connects the battery/battery pack 140 to the battery charger circuit 100. The charging regulation circuit 130 may further be configured to provide at least the charging control signal ICTR to control the charging control transistor 120 to provide the charging voltage VBAT and the charging current Ichg.

The charging regulation circuit 130 may further comprise a charging termination control module 150. The charging termination control module 150 may be configured to detect/monitor/sense the charging current Ichg, and to make the battery charger circuit 100 to stop charging the battery/battery pack 140 once the charging current Ichg is decreased to reach or to be lower than a predetermined charging termination current. In an embodiment, the charging termination control module 150 may be coupled to the first terminal, the second terminal and the control terminal of the charging control transistor 120. The charging termination control module 150 may be configured to detect/monitor/sense the charging current Ichg flowing through the charging control transistor 120 to provide a current sense signal VSEN indicative of the charging current Ichg. The charging termination control module 150 may further be configured to compare the current sense signal VSEN with a charging termination threshold VTH that may be indicative of the predetermined charging termination current. When the current sense signal VSEN is decreased to reach or to be lower than the charging termination threshold VTH, it may indicate that the charging current Ichg is decreased to reach or to be lower than the predetermined charging termination current, and thus the charging termination control module 150 determines that the battery/battery pack 140 is fully charged and may be configured to turn the charging control transistor 120 off to make the charger circuit 100 to stop charging the battery/battery pack 140.

Figure 2:
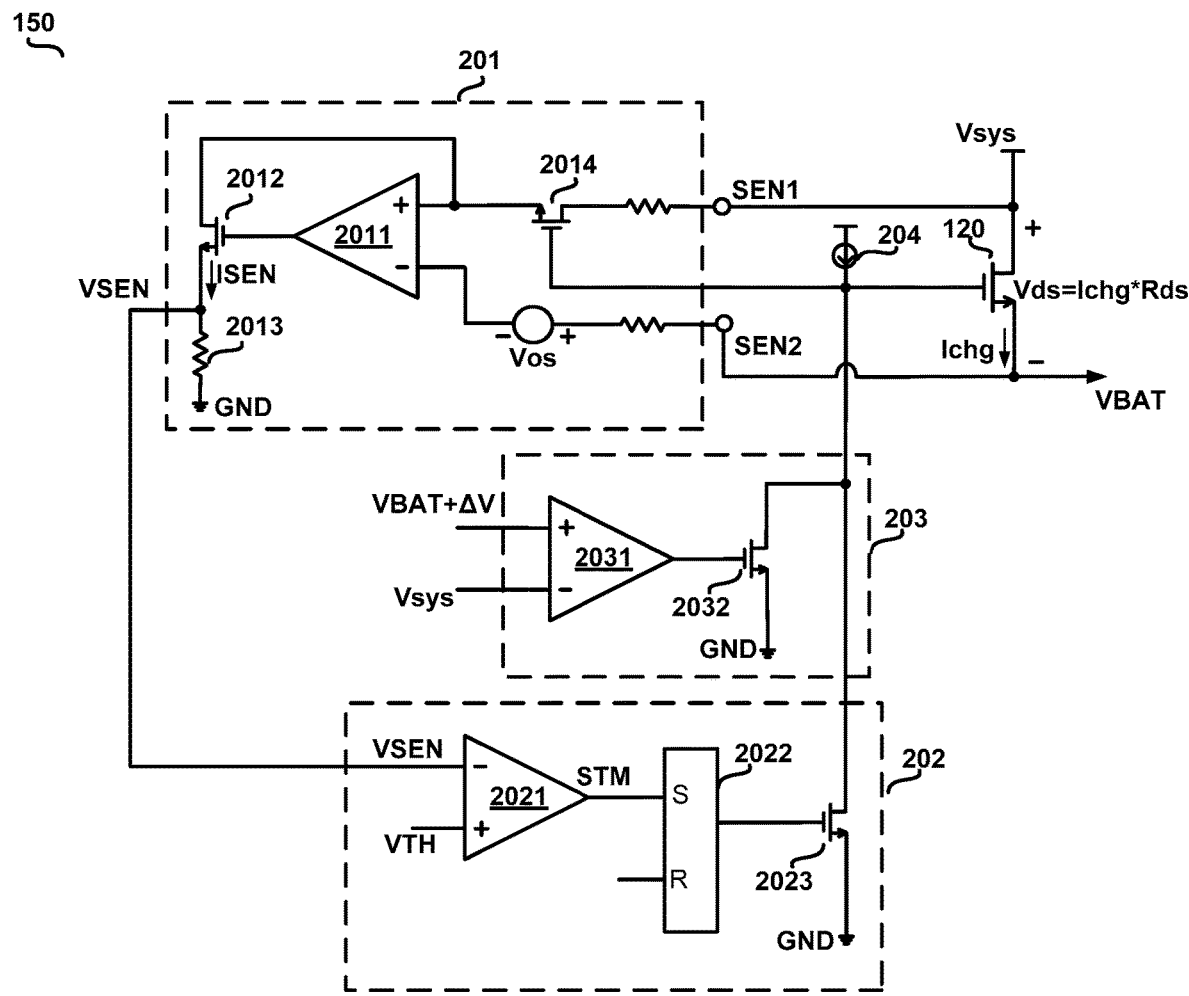
FIG. 2 illustrates a schematic diagram of a charging termination control module 150 in accordance with an embodiment of the present invention.

FIG. 2 illustrates a schematic diagram of a charging termination control module 150 in accordance with an embodiment of the present invention. The charging termination control module 150 may comprise a charging current sense circuit 201, a charging termination determination circuit 202 and a charging termination tuning circuit 203.

The charging current sense circuit 201 may be coupled to the first terminal and the second terminal of the charging control transistor 120, and may be configured to detect/monitor/sense the charging current Ichg flowing through the charging control transistor 120 to provide the current sense signal VSEN. The charging current sense circuit 201 may have a first sensing input terminal SEN1, a second sensing input terminal SEN2 and a sensing output terminal, wherein the first sensing input terminal SEN1 may be coupled to the first terminal of the charging control transistor 120 and the second sensing input terminal SEN2 may be coupled to the second terminal of the charging control transistor 120. A sensing offset Vos may exist at the first sensing terminal SEN1 or at the second sensing terminal SEN2 (e.g. it is illustrated in the example of FIG. 2 that a sensing offset Vos exists at the second sensing input terminal SEN2). The charging current sense circuit 201 may be configured to provide the current sense signal VSEN at the sensing output terminal.

The charging termination determination circuit 202 may be configured to receive the current sense signal VSEN and to compare the current sense signal VSEN with the charging termination threshold VTH, wherein when the current sense signal VSEN is decreased to reach or to be lower than the charging termination threshold VTH, the charging termination determination circuit 202 is configured to turn off the charging control transistor 120.

The existence of the sensing offset Vos in the charging current sense circuit 201 may limit the minimum value that can be set to the predetermined charging termination current of the charging termination control module 150 and thus affects the charging termination determination precision. That is to say, the sensing offset Vos may affect the precision that the charging termination control module 150 determines when the battery/battery pack 140 is fully charged. An example will be provided here to help better understand the embodiments of the present invention. During the battery charger circuit 100 charging the battery/battery pack 140, the charging control transistor 120 normally operates in the linear region (full conduction region). In the linear region (full conduction region), the charging control transistor 120 may operates as a switch element that can perform on and off switching. When the charging control transistor 120 is switched on, an on resistance Rds between its first terminal and its second terminal may be substantially constant and relatively small. Assume an on resistance Rds of the charging control transistor 120 operating in the linear region is 10 m$\Omega$ (i.e. Rds=10 m$\Omega$), if the charging current Ichg is 1 A, a transistor voltage drop Vds across the first terminal and the second terminal of the charging control transistor 120 would be Vds=Rds*Ichg=10 m$\Omega$*1 A=10 mV. If the charging current Ichg is decreased from 1 A to 200 mA, the transistor voltage drop Vds across the first terminal and the second terminal of the charging control transistor 120 will decrease to 2 mV. Generally, the sensing offset Vos (at the first sensing terminal SEN1 or at the second sensing terminal) of the charging current sense circuit 201 must be smaller than the transistor voltage drop Vds across the first terminal and the second terminal of the charging control transistor 120 so that the charging current sense circuit 201 is capable to detect/monitor/sense the charging current Ichg. Otherwise, the charging current sense circuit 201 may not be able to detect/monitor/sense the charging current Ichg. However, due to manufacturing process, parasitic parameters and other influencing factors, the sensing offset Vos cannot be eliminated but only be made as small as possible. Assume that the sensing offset Vos can be at best made to be as small as 2 mV, for the situation when the charging current Ichg is 1 A, since Vds=10 mV>Vos=2 mV, the charging current sense circuit 201 can substantially detect/monitor/sense the charging current Ichg accurately. When the charging current Ichg is decreased to 200 mA, Vds=2 mV=Vos, the charging current sense circuit 201 is at a critical point at which it may still be able to detect/monitor/sense the charging current Ichg. When the charging current Ichg continues decreasing, the transistor voltage drop Vds across the first terminal and the second terminal of the charging control transistor 120 will be smaller than 2 mV, i.e. Vds<Vos=2 mV, the charging current sense circuit 201 will no longer be able to detect/monitor/sense the charging current Ichg. Thus, the minimum value that the predetermined charging termination current can be set to is limited to 200 mA in this example.

The charging termination tuning circuit 203 may advantageously improve the charging termination determination precision and allow the charging termination control module 150 to set a smaller predetermined charging termination current than without the charging termination tuning circuit 203. The charging termination tuning circuit 203 may be configured to receive the system voltage Vsys and the charging voltage VBAT and further to compare a difference between the system voltage Vsys and the charging voltage VBAT with a predetermined difference value $\Delta V$. The difference between the system voltage Vsys and the charging voltage VBAT may also represent the transistor voltage drop Vds across the first terminal and the second terminal of the charging control transistor 120 in this example. The charging termination tuning circuit 203 may further be configured to control the charging control transistor 120 to enter and operate in the saturation region once the difference between the system voltage Vsys and the charging voltage VBAT reaches the predetermined difference value $\Delta V$. When the charging control transistor 120 operates in the saturation region, the on resistance Rds between its first terminal and second terminal is variable. The charging termination tuning circuit 203 may further be configured to tune the on resistance Rds to regulate and maintain the difference between the system voltage Vsys and the charging voltage VBAT (i.e. the transistor voltage drop Vds across the first terminal and the second terminal of the charging control transistor 120) at the predetermined difference value $\Delta V$. In this fashion, if the charging current Ichg decreases, the on resistance Rds of the charging control transistor 120 operating in the saturation region will increase to maintain the transistor voltage drop Vds at the predetermined difference value $\Delta V$. The predetermined difference value $\Delta V$ may be chosen to be greater than the sensing offset Vos in the charging current sense circuit 201. Thus, the charging current sense circuit 201 can be maintained to be capable to detect/monitor/sense the charging current Ichg.

To help better understand the embodiments comprising the charging termination tuning circuit 203, continuation descriptions will be given to the example provided in the passage [0025]. When the charging current Ichg continues decreasing e.g. to be smaller than 200 mA, the charging termination tuning circuit 203 controls the charging control transistor 120 to enter and operate in the saturation region and regulates the on resistance Rds of the charging control transistor 120 to increase with the charging current Ichg decreasing to maintain the transistor voltage drop Vds at the predetermined difference value ΔV. Therefore, since the transistor voltage drop Vds can be maintained at the predetermined difference value ΔV which is greater than the sensing offset Vos in the charging current sense circuit 201, the charging current sense circuit 201 can continuously detect/monitor/sense the charging current Ichg despite of the charging current Ichg decreasing. Thus, the predetermined charging termination current can be set to a current value lower than 200 mA. Theoretically, the charging termination tuning circuit 203 may allow the charging termination control module 150 to set the predetermined charging termination current to be as close as possible to zero, no longer limited by the sensing offset Vos of the charging current sense circuit 201. Consequently, the charging termination control module 150 can determine the full charge of the battery/battery pack 140 with higher precision, i.e., the charging termination determination precision is improved.

In accordance with an exemplary embodiment of the present invention, the charging current sense circuit 201 may comprise a current sense amplifier 2011, a current sense output transistor 2012 and a current sense resistive element 2013. The current sense amplifier 2011 may have a first sense-amplifier input terminal (e.g. the "+" input terminal illustrated in FIG. 2), a second sense-amplifier input terminal (e.g. the "−" input terminal illustrated in FIG. 2) and a sense-amplifier output terminal. The first sense-amplifier input terminal may be coupled to the first terminal of the charging control transistor 120 and the second sense-amplifier input terminal may be coupled to the second terminal of the charging control transistor 120. The current sense amplifier 2011 may have the sensing offset Vos at the first sense-amplifier input terminal or at the second sense-amplifier input terminal. The current sense output transistor 2012 may have a first terminal coupled to the first sense-amplifier input terminal, a control terminal coupled to the sense-amplifier output terminal, and a second terminal configured to provide a sensed current ISEN. The current sense resistive element 2013 may have a first terminal coupled to the second terminal of the current sense output transistor 2012 and a second terminal connected to the reference ground GND. The current sense resistive element 2013 may be configured to provide the current sense signal VSEN at its first terminal. In an embodiment, the charging current sense circuit 201 may further comprise a current sense transistor 2014. In the example of FIG. 2, the current sense transistor 2014 is illustrated to comprise a MOSFET, however this is not intended to be limiting, the current sense transistor 2014 may comprise any other suitable transistor including but not limited to BJT, JFET, IGBT, etc. The current sense transistor 2014 may have a first terminal coupled to the first terminal of the charging control transistor 120, a second terminal coupled to the first sense-amplifier input terminal, and a control terminal coupled to the control terminal of the charging control transistor 120. In alternative embodiments, the current sense transistor 2014 may be integrated into the current sense amplifier 2011. One of ordinary skill in the art would understand that the charging current sense circuit 201 described in this passage with reference to FIG. 2 is only for illustration and is not intended to be limiting.

In accordance with an exemplary embodiment of the present invention, the charging termination determination circuit 202 may comprise a determination comparator 2021 and a flip-flop 2022. The determination comparator 2021 may have a first comparator input terminal (e.g. the "−" input terminal of 2021 illustrated in FIG. 2), a second comparator input terminal (e.g. the "−" input terminal of 2021 illustrated in FIG. 2) and a comparator output terminal. The determination comparator 2021 may be configured to receive the current sense signal VSEN at the first comparator input terminal, to receive the charging termination threshold VTH at the second comparator input terminal, and to provide a charging termination indication signal STM at the comparator output terminal. When the current sense signal VSEN is decreased to reach or to be lower than the charging termination threshold VTH, the charging termination indication signal STM indicates that charging of the battery/battery pack 140 should be terminated (i.e. the battery/battery pack 140 is fully charged). The flip-flop 2022 may have a flip-flop set input terminal S coupled to the comparator output terminal to receive the charging termination indication signal STM and a flip-flop output terminal coupled to the charging control transistor 120. The flip-flop 2022 may be configured to set the flip-flop output terminal to a preset logic level to turn off the charging control transistor 120 once the charging termination indication signal STM indicates that charging of the battery/battery pack 140 should be terminated.

The charging termination determination circuit 202 may further comprise a controllable switch 2023. The controllable switch 2023 may have a first switch terminal coupled to the control terminal of the charging control transistor 120, a second switch terminal connected to the reference ground GND, and a switch control terminal coupled to the flip-flop output terminal of the flip-flop 2022. Once the flip-flop 2022 sets the flip-flop output terminal to the preset logic level, the controllable switch 2023 is turned on to turn the charging control transistor 120 off.

In accordance with an exemplary embodiment of the present invention, the charging termination tuning circuit 203 may comprise a tuning amplifier 2031 and tuning transistor 2032. The tuning amplifier 2031 may have a first tuning-amplifier input terminal (e.g. the "+" input terminal of 2031 illustrated in FIG. 2), a second tuning-amplifier input terminal (e.g. the "−" input terminal of 2031 illustrated in FIG. 2) and a tuning-amplifier output terminal. The tuning amplifier 2031 may be configured to receive a superposition signal (VBAT+ΔV) at the first tuning-amplifier input terminal and to receive the system voltage Vsys at the second tuning amplifier input terminal, wherein the superposition signal (VBAT+ΔV) may be provided by superposing the charging voltage VBAT with the predetermined difference value ΔV. The tuning amplifier 2031 in FIG. 2 is just for illustration purpose and not intended to be limiting. The tuning amplifier 2031 may be implemented by any amplifier configuration that can detect the transistor voltage drop Vds (or the difference between the system voltage Vsys and the charging voltage VBAT) and calculate a difference between the transistor voltage drop Vds (or the difference between the system voltage Vsys and the charging voltage VBAT) and the predetermined difference value ΔV. In an alternative embodiment, the tuning amplifier 2031 may be coupled to the second terminal of the charging control transistor 120 via the first tuning-amplifier input terminal while superposing the predetermined difference value ΔV to the first tuning-amplifier input terminal. The tuning amplifier 2031 may also be coupled to the first terminal of the charging control transistor 120 via the second tuning-amplifier input terminal. The tuning amplifier 2031 may thus be configured to provide a difference signal indicative of the difference between the transistor voltage drop Vds (or the difference between the system voltage Vsys and the charging voltage VBAT) and the predetermined difference value ΔV at the tuning-amplifier output terminal. In an alternative embodiment, the tuning amplifier 2031 may be configured to receive the transistor voltage drop Vds (or the difference between the system voltage Vsys and the charging voltage VBAT) at the first tuning-amplifier input terminal, to receive the predetermined difference value ΔV at the second tuning-amplifier input terminal, and to provide the difference signal indicative of the difference between the transistor voltage drop Vds (or the difference between the system voltage Vsys and the charging voltage VBAT) and the predetermined difference value ΔV at the tuning-amplifier output terminal. The tuning transistor 2032 may have a first terminal coupled to the control terminal of the charging control transistor 120, a second terminal connected to the reference ground GND and a control terminal coupled to the tuning-amplifier output terminal. The tuning amplifier 2031 may be configured to regulate the tuning transistor 2032 to operate in its saturation region wherein the tuning transistor 2032 may have a variable on resistance.

In accordance with an exemplary embodiment of the present invention, the charging termination control module 150 may further comprise a charge pump 204. The charge pump 204 may be coupled to the control terminal of the charging control transistor 120 to provide driving power for the charging control transistor 120. For instance, the charge pump 204 may provide a driving voltage or a driving current for the charging control transistor 120.

One of ordinary skill in the art should understand that the charging termination control module 150 and the battery charger circuit 100 described with reference to FIG. 1 and FIG. 2 are illustrative and not limiting. The charging termination control module 150 may allow the battery charger circuit 100 to have a very small (infinitely close to zero) predetermined charging termination current (which is used to determine whether the battery/battery pack 140 is fully charged), and thus advantageously improve the allowable charge level of the battery/battery pack 140 (e.g. the allowable charge level may infinitely approach the battery/battery pack's real full charge level) with improved charging termination determination precision.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:
1. A charging termination control module, comprising:
   a charging control transistor, having a first terminal configured to receive a regulated system voltage and a second terminal configured to provide a charging voltage and a charging current;
   a charging current sense circuit, configured to detect/monitor/sense the charging current to provide a current sense signal indicative of the charging current;
   a charging termination determination circuit, configured to receive the current sense signal and to compare the current sense signal with a charging termination threshold, wherein the charging termination determination circuit is further configured to turn the charging control transistor off when the current sense signal reaches or is lower than the charging termination threshold; and
   a charging termination tuning circuit, configured to receive the system voltage and the charging voltage, and further configured to compare a difference between the system voltage and the charging voltage with a predetermined difference value, and further configured to control the charging control transistor to enter and operate in its saturation region once the difference between the system voltage and the charging voltage reaches the predetermined difference value.

2. The charging termination control module of claim 1, wherein the charging current sense circuit has a sensing offset at an input terminal of the charging current sense circuit, and wherein the predetermined difference value is greater than the sensing offset.

3. The charging termination control module of claim 1, wherein the charging current sense circuit has a first sensing input terminal, a second sensing input terminal and a sensing output terminal, wherein the first sensing input terminal is coupled to the first terminal of the charging control transistor and the second sensing input terminal is coupled to the second terminal of the charging control transistor, and wherein the charging current sense circuit has a sensing offset at the first sensing input terminal or at the second sensing input terminal, and wherein the predetermined difference value is greater than the sensing offset, and wherein the charging current sense circuit is configured to provide the current sense signal at the sensing output terminal.

4. The charging termination control module of claim 1, wherein the charging current sense circuit comprises:
   a current sense amplifier having a first sense-amplifier input terminal, a second sense-amplifier input terminal and a sense-amplifier output terminal, wherein the first sense-amplifier input terminal is coupled to the first terminal of the charging control transistor and the second sense-amplifier input terminal is coupled to the second terminal of the charging control transistor, and wherein the current sense amplifier has a sensing offset at the first sense-amplifier input terminal or at the second sense-amplifier input terminal, and wherein the predetermined difference value is greater than the sensing offset;
   a current sense output transistor having a first terminal coupled to the first sense-amplifier input terminal, a control terminal coupled to the sense-amplifier output terminal, and a second terminal configured to provide a sensed current; and
   a current sense resistive element having a first terminal coupled to the second terminal of the current sense output transistor and a second terminal connected to a reference ground, wherein the current sense resistive element is configured to provide the current sense signal at its first terminal.

5. The charging termination control module of claim 4, wherein the charging current sense circuit further comprises:

a current sense transistor having a first terminal coupled to the first terminal of the charging control transistor, a second terminal coupled to the first sense-amplifier input terminal, and a control terminal coupled to the control terminal of the charging control transistor.

6. The charging termination control module of claim 1, wherein the charging termination determination circuit comprises:
a determination comparator having a first comparator input terminal, a second comparator input terminal and a comparator output terminal, wherein the determination comparator is configured to receive the current sense signal at the first comparator input terminal, to receive the charging termination threshold at the second comparator input terminal, and to provide a charging termination indication signal at the comparator output terminal; and
a flip-flop having a flip-flop set input terminal configured to receive the charging termination indication signal and a flip-flop output terminal coupled to the charging control transistor, wherein the flip-flop is configured to set the flip-flop output terminal to a preset logic level to turn off the charging control transistor when the current sense signal is decreased to reach or to be lower than the charging termination threshold.

7. The charging termination control module of claim 6, wherein the charging termination determination circuit further comprises:
a controllable switch having a first switch terminal coupled to the control terminal of the charging control transistor, a second switch terminal connected to a reference ground, and a switch control terminal coupled to the flip-flop output terminal, wherein once the flip-flop output terminal is set to the preset logic level, the controllable switch is turned on.

8. The charging termination control module of claim 1, wherein the charging termination tuning circuit comprises:
a tuning amplifier having a first tuning-amplifier input terminal, a second tuning-amplifier input terminal and a tuning-amplifier output terminal, wherein the tuning amplifier is configured to receive a superposition signal at the first tuning-amplifier input terminal and to receive the system voltage at the second tuning amplifier input terminal, wherein the superposition signal is provided by superposing the charging voltage with the predetermined difference value; and
a tuning transistor having a first terminal coupled to the control terminal of the charging control transistor, a second terminal connected to a reference ground and a control terminal coupled to the tuning-amplifier output terminal.

9. The charging termination control module of claim 1, further comprising:
a charge pump, coupled to the control terminal of the charging control transistor to provide driving power for the charging control transistor.

10. A battery charger circuit comprising:
a charging control transistor, having a first terminal, a second terminal and a control terminal; and
a charging termination control module, coupled to the first terminal, the second terminal and the control terminal of the charging control transistor, wherein the charging termination control module is configured to detect/monitor/sense a charging current flowing through the charging control transistor and to turn off the charging control transistor once the charging current is decreased to reach or to be lower than a predetermined charging termination current, and is further configured to maintain a transistor voltage drop across the first terminal and the second terminal of the charging control transistor at a predetermined difference value once the transistor voltage drop reaches the predetermined difference value.

11. The battery charger circuit of claim 10, wherein the charging termination control module is configured to control the charging control transistor to enter and operate in its saturation region once the transistor voltage drop reaches the predetermined difference value.

12. The battery charger circuit of claim 10, wherein the charging termination control module comprises:
a charging current sense circuit, configured to detect/monitor/sense the charging current to provide a current sense signal indicative of the charging current;
a charging termination determination circuit, configured to receive the current sense signal and to compare the current sense signal with a charging termination threshold, wherein the charging termination determination circuit is further configured to turn the charging control transistor off when the current sense signal reaches or is lower than the charging termination threshold; and
a charging termination tuning circuit, configured to compare the transistor voltage drop with the predetermined difference value, and further configured to maintain the transistor voltage drop at the predetermined difference value once the transistor voltage drop reaches the predetermined difference value.

13. The battery charger circuit of claim 12, wherein the charging current sense circuit has a sensing offset at an input terminal of the charging current sense circuit, and wherein the predetermined difference value is greater than the sensing offset.

14. The battery charger circuit of claim 12, wherein the charging current sense circuit has a first sensing input terminal, a second sensing input terminal and a sensing output terminal, wherein the first sensing input terminal is coupled to the first terminal of the charging control transistor and the second sensing input terminal is coupled to the second terminal of the charging control transistor, and wherein the charging current sense circuit has a sensing offset at the first sensing input terminal or at the second sensing input terminal, and wherein the predetermined difference value is greater than the sensing offset, and wherein the charging current sense circuit is configured to provide the current sense signal at the sensing output terminal.

15. The battery charger circuit of claim 12, wherein the charging current sense circuit comprises:
a current sense amplifier having a first sense-amplifier input terminal, a second sense-amplifier input terminal and a sense-amplifier output terminal, wherein the first sense-amplifier input terminal is coupled to the first terminal of the charging control transistor and the second sense-amplifier input terminal is coupled to the second terminal of the charging control transistor;
a current sense output transistor having a first terminal coupled to the first sense-amplifier input terminal, a control terminal coupled to the sense-amplifier output terminal, and a second terminal; and
a current sense resistive element having a first terminal coupled to the second terminal of the current sense output transistor and a second terminal connected to a reference ground, wherein the current sense resistive element is configured to provide the current sense signal at its first terminal.

16. The battery charger circuit of claim 15, wherein the current sense amplifier has a sensing offset at the first sense-amplifier input terminal or at the second sense-amplifier input terminal, and wherein the predetermined difference value is greater than the sensing offset.

17. The battery charger circuit of claim 12, wherein the charging termination determination circuit comprises:
   a determination comparator having a first comparator input terminal, a second comparator input terminal and a comparator output terminal, wherein the determination comparator is configured to respectively receive the current sense signal at the first comparator input terminal and the charging termination threshold at the second comparator input terminal; and
   a flip-flop having a flip-flop set input terminal coupled to the comparator output terminal and a flip-flop output terminal coupled to the charging control transistor, wherein the flip-flop is configured to turn off the charging control transistor when the current sense signal is decreased to reach or to be lower than the charging termination threshold.

18. The battery charger circuit of claim 12, wherein the charging termination tuning circuit comprises:
   a tuning amplifier having a first tuning-amplifier input terminal, a second tuning-amplifier input terminal and a tuning-amplifier output terminal, wherein the first tuning-amplifier input terminal is coupled to the second terminal of the charging control transistor with the predetermined difference value superposed thereto, and wherein the second tuning-amplifier input terminal is coupled to the first terminal of the charging control transistor; and
   a tuning transistor having a first terminal coupled to the control terminal of the charging control transistor, a second terminal connected to a reference ground and a control terminal coupled to the tuning-amplifier output terminal.

19. A charging termination control module, comprising:
   a charging current sense circuit, configured to detect/monitor/sense a charging current flowing through a charging control transistor to provide a current sense signal;
   a charging termination determination circuit, configured to receive the current sense signal and to compare the current sense signal with a charging termination threshold, wherein the charging termination determination circuit is further configured to turn the charging control transistor off when the current sense signal reaches or is lower than the charging termination threshold; and
   a charging termination tuning circuit, configured to compare a transistor voltage drop across the charging control transistor with a predetermined difference value, and further configured to maintain the transistor voltage drop at the predetermined difference value once the transistor voltage drop reaches the predetermined difference value.

20. The charging termination control module of claim 19, wherein the charging termination tuning circuit comprises:
   a tuning amplifier configured to detect or receive the transistor voltage drop and to calculate a difference between the transistor voltage drop and the predetermined difference value to provide a difference signal at a tuning-amplifier output terminal; and
   a tuning transistor having a first terminal coupled to the control terminal of the charging control transistor, a second terminal connected to a reference ground and a control terminal coupled to the tuning-amplifier output terminal.

* * * * *